United States Patent [19]  [11] 4,353,004
Kleinschmidt  [45] Oct. 5, 1982

[54] CIRCUIT FOR ALTERNATE TRANSMISSION AND RECEPTION WITH ONLY ONE SOUND SOURCE TRANSDUCER

[75] Inventor: Peter Kleinschmidt, Munich, Fed. Rep. of Germany

[73] Assignee: Siemens Aktiengesellschaft, Berlin & Munich, Fed. Rep. of Germany

[21] Appl. No.: 225,187

[22] Filed: Jan. 14, 1981

[30] Foreign Application Priority Data

Jan. 30, 1980 [DE] Fed. Rep. of Germany ....... 3003317

[51] Int. Cl.$^3$ ............................................. H01L 41/08
[52] U.S. Cl. ................................... 310/318; 367/903;
310/317
[58] Field of Search .................... 310/316–319;
367/87, 137, 903; 340/384 E; 73/596, 620,
629–631

[56] References Cited

U.S. PATENT DOCUMENTS

| | | | |
|---|---|---|---|
| 2,852,676 | 9/1958 | Joy | 310/319 X |
| 2,963,680 | 12/1960 | Beebe | 310/317 X |
| 2,983,902 | 5/1961 | Philipps | 310/317 X |
| 3,100,886 | 8/1963 | Marks | 310/317 X |
| 3,989,963 | 11/1976 | Giaccardi | 310/318 |
| 4,044,297 | 8/1977 | Nobue | 310/317 X |
| 4,096,756 | 6/1978 | Alphonse | 310/317 X |

Primary Examiner—Mark O. Budd
Attorney, Agent, or Firm—Hill, Van Santen, Steadman, Chiara & Simpson

[57] ABSTRACT

A circuit is provided for supplying a transmission oscillator voltage suitable for a piezoelectric sound source transducer in which the transducer also serves as a receiving transducer. The circuit contains an electrical series resonant circuit having a capacitor C and an inductor L with $$L \cdot C = (\tfrac{1}{2} \pi f_0)^2,$$

wherein the electrical series resonant circuit is matched to the series resonant frequency $f_0$ of the transducer and is connected parallel to the transducer. The circuit further contains a pair of diodes, connected anti-parallel to one another, and connected in parallel to either the inductor L or to the capacitor C, with the output of the receiver being connected to the capacitor C or to the inductor L.

7 Claims, 6 Drawing Figures

CIRCUIT FOR ALTERNATE TRANSMISSION AND RECEPTION WITH ONLY ONE SOUND SOURCE TRANSDUCER

BACKGROUND OF THE INVENTION

1. Field of the Invention

The present invention relates to a circuit for supplying the transmission oscillator voltage for a piezoelectric sound source transducer.

2. Description of the Prior Art

It is known in the art to transmit ultrasonic waves generated by electrical excitation with an ultrasonic source transducer, to receive the echo signals with a sound pick-up transducer and to evaluate the electrical echo signals thereby obtained, for example, for range finding. As a rule, a transducer having a noticeable resonance step-up is employed in order to increase the acoustic power and the sound source transducer consisting of an oscillator having a low internal impedance is voltage-fed to its series resonance frequency $$f_o = \tfrac{1}{2}\pi(L_m \cdot C_m)^{\frac{1}{2}},$$

wherein $L_m$ and $C_m$ are mechanical inductance and the mechanical capacitance of the equivalent circuit of the transducer.

Reception is executed with the assistance of a second, separate receiver transducer whose parallel resonance is provided by $$f_p = \tfrac{1}{2}\pi\{L_m \cdot (C_m \cdot C_o)/(C_m + C_o)\}^{\frac{1}{2}}$$

where $C_o$ is the electrical parallel capacitance of the transducer in its equivalent circuit. The receiver transducer is high-resistant for the parallel resonant frequency $f_p$ and supplies a signal voltage from the received echoes which can be evaluated with a correspondingly great signal-to-noise ratio. Both transducers are matched in such a manner that $F_o$ of the transmission transducer equals $f_p$ of the receiving transducer. The fact that the frequency $f_o$ of a transducer is smaller than the frequency $f_p$ forces the employment of two transducers which are differently tuned, i.e. to different series resonant frequencies $f_o$ (of the transmission transducer) and $f'_o$ (of the receiving transducer).

Although it is at least conceivable, while accepting lower signal-to-noise ratios and/or lower receiving power, to employ one and the same acoustic transducer for transmitting and for receiving, particularly when the receiving transducer also has a very poor oscillatory quality, i.e., a very great band width (with a correspondingly small resonant step-up), another possibility is to work with only a single transducer and, while foregoing and effective electrical excitation and acoustic emission, to excite the transducer as a transmitter in the parallel resonant frequency $f_p$.

SUMMARY OF THE INVENTION

The object of the present invention is to provide a circuit for a transmission sound source transducer which can be optimally excited at a series resonant frequency $f_o$ and with which, alternately, receiving can also be executed with the same, single transducer with a likewise optimally high receiving efficiency and high signal-to-noise ratio.

The above object is achieved, according to the present invention, for a circuit of the type generally set forth above, in that, for alternate receiving in addition to transmission with a single sound source transducer, the circuit contains an electrical series resonant circuit having a capacitance and an inductance with which $$f = \tfrac{1}{2}\pi(LC)^{\frac{1}{2}},$$

wherein the electrical series resonant circuit is matched to the series resonant frequency $s_o$ of the sound source transducer and is connected in parallel to the transducer, and which further contains a parallel circuit consisting of two diodes connected anti-parallel, wherein the diode parallel circuit is connected in parallel either to the inductance or to the capacitance and wherein the receiver output is connected to the capacitance or to the inductance.

BRIEF DESCRIPTION OF THE DRAWINGS

Other objects, features and advantages of the invention, its organization, construction and operation will be best understood from the following detailed description taken in conjunction with the accompanying drawing, on which.

DESCRIPTION OF THE PREFERRED EMBODIMENTS

Figure 1:
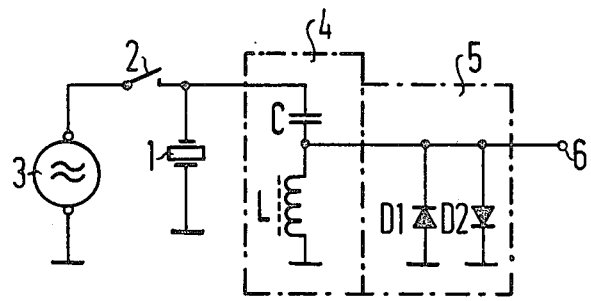
FIG. 1 is a schematic circuit diagram of a first variation of an exemplary embodiment of the invention.

FIG. 1 illustrates a sound source transducer which, according to the invention, is to also be employed as a receiving transducer, in particular with a high efficiency. An element 2, symbolically illustrated as a swtich, operates at a switch to supply the excitation alternating voltage of an oscillator 3 for the transmit mode to the sound source transducer 1 at predetermined transmit time intervals. When the switch 2 is closed, therefore, the transmission clock or cadence can be determined. The switch 2 can be a clock modulation of the transmission oscillator 3, i.e. a switching on and off of the oscillator. However, specific embodiments of such a fundamental switch 2 which are advantageously designed within the framework of the invention will be discussed below.

Figure 2:
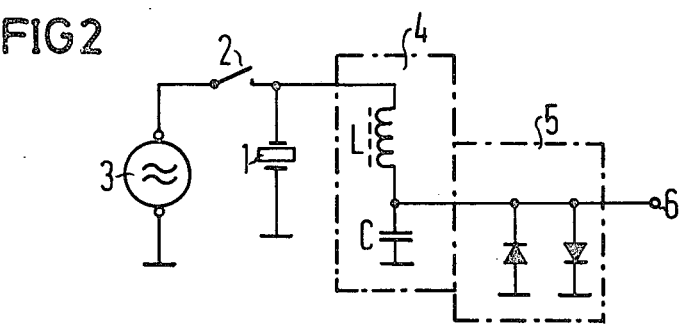
FIG. 2 is a schematic circuit diagram showing a corresponding, second variation of an exemplary embodiment of the invention.
Figure 3:
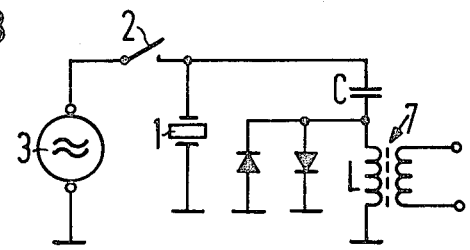
FIGS. 3 and 4 illustrate further devemopments of the invention having a transformer output for the variations according to FIGS. 1 and 2.
Figure 4:
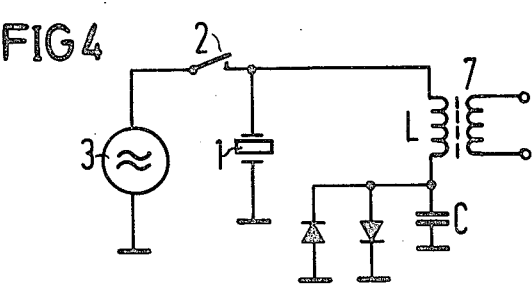

A series resonant circuit 4 comprising a capacitor C and an inductor L which shall be described in terms of actual function in greater detail below in connected parallel to the sound source transducer 1. With its resonance $$f = \tfrac{1}{2}\pi(LC)^{\frac{1}{2}}$$

this series resonant circuit 4 is matched to the series resonant frequency
$$f_o = \tfrac{1}{2}\pi(C_m L_m)^{\frac{1}{2}}$$

of the transducer 1. So that the series resonant circuit 4 is not an unnecessary short circuit 4 and parallel to the transducer 1 in the transmit mode, i.e. given the switch 2 in a closed condition, according to a further feature of the invention, a parallel connection 5 of a pair of diodes D1 and D2 (as illustrated on the drawings) connected anti-parallel to one another, is connected in parallel to either the inductor L (FIGS. 1 and 3) or to the capaictor C (FIGS. 2 and 4). The diodes D1 and D2 represent short circuits for the relatively high voltages occurring during the transmit mode at the transducer 1 and, therefore, at the inductor L and at the capacitor C (given non-existence of the diode parallel circuit), short circuits for the respective half wave of the oscillator alternating voltage which arrives at the diodes. This short circuit effect of the diodes D1 and D2 leads to the fact that the series resonant circuit 4 is extremely greatly attenuated in the transmit mode, i.e. when the switch 2 is closed, so that the series resonant circuit, given the high excitation voltages of the oscillator 3 at the transducer 1, appears as a resistor which is high-resistant relative to the transducer resistance and, consequently, does not represent a significant shunt for the electrical excitation of the transducer 1.

The conditions given ultrasonic reception with the transducer 1 are completely different. Of necessity, the echo signals have the frequency $f_o$. An electrical EMF (of the frequency $f_o$) is now generated as a reception signal in the transducer 1 which now operates as a receiver and with an internal resistance which continues to be low for the frequency $f_o$. This generated EMF, due to the switch 2 opened in the pauses of the transmit mode, only occurs at the series resonant circuit 4 comprising the capacitor C and the inductor L. Given a relatively high quality of the series resonant circuit 4, its resonant impedance in this series resonance is small in comparison to the series resonant internal resistance of the transducer 1. A particular advantage of employing the series resonant circuit 4 lies in the resonance step-up of the reception EMF of the transducer 1 at the capacitor C and at the inductor L. The reception signal voltage occurring at the inductor L (FIGS. 1 and 3) or, respectively at the capacitor C (FIGS. 2 and 4) is greater than the EMF of the transducer by the factor $$\beta = \omega L/R = 1/\omega CR$$

where R is the ohmic equivalent resistance of the transducer. As a rule, this voltage always remains below a value of approximately 0.6 volts, in particular below the threshold voltage of the diodes D1 and D2. In comparison to such a reception voltage, the diodes D1 and D2 are high-resistant and, therefore, are negligible as short circuits. A parallel connection effect of the diodes D1 and D2 occurring at voltages above 0.6 volts is without interest for the fact that, in this case, the reception signal voltage is already so great that a limiting of the reception signals does not represent a disadvantage. On the contrary, it is even advantageous to keep signals which are too great away from the following amplifiers The signal output for the received echo signal of the transducer 1 is referenced 6. In the embodiments of FIGS. 3 and 4, the inductor L of FIGS. 1 and 2 is designed as a transformer 7. With the transformer 7, the output impedance of the circuit constructed in accordance with the present invention can be simply dimensioned to that value which is desired at the output terminal 6.

By dimensioning the capaictor C to be smaller than the value $C_o$ of the electrical parallel capacitance of the sound source transducer or dimensioning the capacitor C to the value $C_o \cdot k^2$, where $k^2$ represents the electromechanical coupling factor of the transducer and $C_o$ represents its electrical parallel capacitance, the output voltage of the circuit constructed in accordance with the present invention can be increased in that one selects the value C of the capacitor of the series resonance circuit small, for example 1–30 times smaller than the electrical parallel capacitance $C_o$ of the transducer 1, upon observation of the resonance condition $$f_o = \tfrac{1}{2}\pi(LC)^{\frac{1}{2}}.$$

In the case where $C = C_o$, the circuit of the present invention already emits precisely as much voltage as a traditional, second receiving transducer operated at a parallel resonant frequency $f_p$. If, however, the dimensioning mentioned above is even selected where $C < C_o$, a voltage increase approximately corresponding to the ratio $C_o/C$ occurs at the capacitor C at the smaller capacitance thereof. This possible increase of the output voltage by a factor $\alpha$ is limited by the relative band width of the transducer to be achieved. For a large C ($C \approx C_o$), the band width is given only by the band width of the transducer $$f/f = 1/Q_m.$$

If, however, $C_o/C$ is selected greater than the reciprocal quadratic coupling coefficient, an additional, noticeable loss of band width occurs. The value $$\alpha = C_o/C = 1/k^2$$

represents a meaningful limit for $\alpha$.

The equation $$B = B_m/1 + k^2 C_o/C = 1/1 + \alpha k^2$$

holds true for the band width B. In the equation, k is the coupling coefficient of the transducer 1 and $B_m$ is its natural band width. It can be seen from the equation that the receiving band width decreases with increasing $\alpha$. There derives $$\alpha = 1/k^2$$

whereby a reduction of the band width (in comparison to that of the transducer 1 in the series resonance) occurs by the factor 2. If the reduction of the band width is without use-conditioned significance, then a further limit for the voltage gain is provided by the quality of the electrical series circuit $$\alpha_{max} = Q_{el} = k^2 Q_m$$

where $Q_{el}$ is the oscillatory quality of the series resonant circuit and $Q_m$ is the oscillatory quality of the transducer.

In conjunction with the switch 2, possibilities of its design which are particularly advantageous within the framework of the present invention, i.e. in conjunction with circuits constructed in accordance with the present invention, were already pointed out above. The circuit element 2, designated as a simple switch in principle is technically realized in such a manner given arrangements in which the transducer 1 serves only as a transmitter that one controls or, respectively, keys the generation and/or emission of the oscillator alternating voltage of the oscillator 3 in one of the many, known possible variations. As is readily apparent, a separation between the transducer 1 and the oscillator 3, i.e. a decoupling of the transducer 1 and the oscillator 3 from one another is not required during the transmission pauses. In the present invention, however, in which the transducer 1 also serves as a receiving transducer, such a coupling between the transducer 1 and the oscillator 3 would be disruptive during the receiving phase. This, particularly because of the low internal resistance of the oscillator 3 and/or because of the high noise output signal of the oscillator 3. According to the present invention, therefore, it is of considerable advantage to undertake a separation or, respectively, decoupling as symbolically indicated with the switch 2 between the transducer 1 and the oscillator 3 during the receiving phase.

Figure 5:
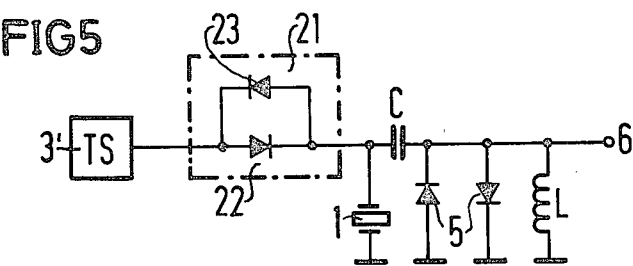
FIGS. 5 and 6 illustrate two variations for a decoupling of the transducer and the oscillator from one another.
Figure 6:
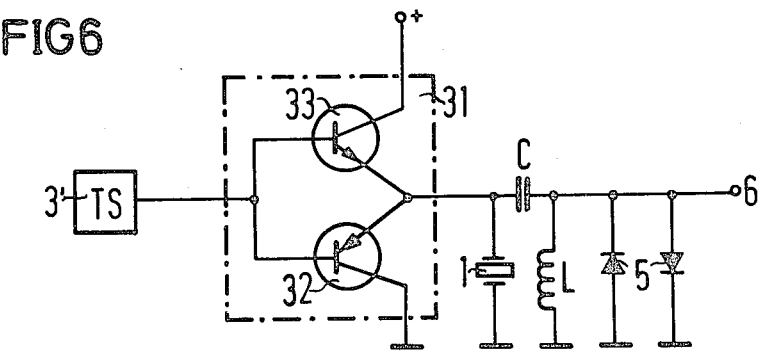

FIGS. 5 and 6 respectively illustrate variations of this further development of the invention for an embodiment of the invention according to FIG. 1. These variations can likewise be realized with the same advantages given circuits according to FIGS. 2–4.

In FIG. 5, the separation or, respectively, decoupling of the transducer 1 and the oscillator 3' achieved by the symbolic switch 2 in FIG. 1 is realized with the assistance of a parallel connection 21 comprising a pair of diodes 22 and 23 connected anti-parallel to one another. Like the switch 2, this parallel connection 21 lies in series between the transducer 1 and the oscillator 3'. The oscillator 3' is designed in such a manner that, as indicated in FIG. 5, it supplies transmission pulses of the alternating voltage with the frequency $f_o$.

To be absolutely precise, the parallel connection 21 here only fulfills the function of the decoupling, whereas the switching of the transmission voltage occurs in the oscillator 3'. The diodes 22 and 23 have identical threshold voltages of approximately 0.6 volts (like the diodes D1 and D2). The diodes 22 and 23 are always high-resistant for the amplitude of the receiving EMF generated in the transducer 1.

FIG. 6 illustrates a parallel connection 31 comprising two transistors 32 and 33 which are connected as a circuit designated as an emitter follower. The bases of the transistors are connected in common and the emitters of the transistors are connected in common. As FIG. 6 illustrates the collector of the one transistor (for example the transistor 32) is connected to ground and the collector of the other transistor (here the transistor 33) is connected to an operating potential. The parallel connection 31 comprising the transistors 32 and 33, as is also shown in FIG. 6, in turn is connected in series between the transducer 1 and the oscillator 3'. The transistors 32 and 33 in the circuit of FIG. 6 additionally see to a low excitation impedance, which is of further significance for the principle of the present invention. This variation according to FIG. 6 is to be preferred when the oscillator circuit 3' available exhibits an internal resistance which is not sufficiently low per se. An oscillator 3' with the function of transmitting clocked transmission alternating voltages $f_0$ is likewise provided in the embodiment according to FIG. 6.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:
1. A circuit arrangement for supplying transmission oscillator voltage to a piezoelectric sound source transducer and further permitting the transducer to operate as a receiving transducer, comprising:
an oscillator for providing an excitation voltage:
a transducer responsive to an excitation voltage to emit waves and responsive to received waves to produce a reception voltage signal;
switching means connected between said oscillator and said transducer and operable to couple and decouple the same;
a series resonant circuit connected in parallel with said transducer and including an inductor and a capacitor and having a resonant frequency $f_O$ defined by

$$L \cdot C = (\tfrac{1}{2}\pi f_O)^2$$

where L and C are the inductance and capacitance values, respectively;
a pair of diodes poled opposite to one another and connected in parallel to one of said elements of said resonant circuit; and
a receiver output connected to said resonant circuit.
2. The circuit arrangement of claim 1, wherein:
said inductor comprises a transformer including a primary winding connected to said capacitor and a secondary winding serving as said output.
3. The circuit arrangement of claim 1, wherein:
said capacitor has a capacitance value C which is smaller than the parallel capacitance value $C_o$ of said transducer.
4. The circuit arrangement of claim 3, wherein:
the capacitance value C is approximately equal to the value $C \cdot k^2$, where $k^2$ is the electro-mechanical coupling factor of said transducer.
5. The circuit arrangement of claim 3, wherein: the ratio $$\alpha = C_o/C$$

is selected such that given a predetermined value $Q_{el}$ of the resonant circuit and a predetermined value $Q_m$ and a predetermined value of the coupling value $k^2$ of the transducer $$C_o/C = Q_{el}/k^2 \cdot Q_m$$

approximately occurs.
6. The circuit arrangement of claim 1, wherein;
said switching means comprises a pair of diodes connected in parallel and opposite polarity to one another and in series between said oscillator and said transducer.
7. The circuit arrangement of claim 1, wherein:
said switching means comprises a pair of switching transistors connected as an emitter follower between said oscillator and said transducer.

* * * * *